United States Patent
Yamada et al.

(10) Patent No.: US 8,405,486 B2
(45) Date of Patent: Mar. 26, 2013

(54) ELECTRIC POWER TRANSMITTING AND RECEIVING DEVICE, ELECTRIC POWER TRANSMITTING DEVICE AND ELECTRIC POWER RECEIVING DEVICE

(75) Inventors: Masaaki Yamada, Yokohama (JP); Taku Takaki, Fujisawa (JP); Yuhei Niwa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 678 days.

(21) Appl. No.: 12/618,998

(22) Filed: Nov. 16, 2009

(65) Prior Publication Data

US 2010/0148939 A1 Jun. 17, 2010

(30) Foreign Application Priority Data

Dec. 16, 2008 (JP) ................... 2008-319857

(51) Int. Cl.
  *H04Q 5/22* (2006.01)
(52) U.S. Cl. ..................... 340/10.34; 320/108
(58) Field of Classification Search ............... 340/10.34, 340/10.1, 572.1, 572.5, 572.7; 320/108; 307/104; 455/290, 340, 272, 274, 275; 343/743, 343/750, 751
See application file for complete search history.

(56) References Cited

U.S. PATENT DOCUMENTS

| | | | |
|---|---|---|---|
| 6,317,027 B1 * | 11/2001 | Watkins ........................ 340/10.1 |
| 2005/0085873 A1 * | 4/2005 | Gord et al. ...................... 607/61 |
| 2008/0111518 A1 | 5/2008 | Toya | |
| 2008/0174267 A1 * | 7/2008 | Onishi et al. .................. 320/108 |
| 2008/0188712 A1 | 8/2008 | Shimizu et al. | |
| 2008/0278264 A1 * | 11/2008 | Karalis et al. ................. 333/219 |
| 2009/0015075 A1 * | 1/2009 | Cook et al. ..................... 307/149 |

FOREIGN PATENT DOCUMENTS

| CN | 101072533 | 11/2007 |
|---|---|---|
| JP | 10-097931 | 4/1998 |
| JP | 2008-141940 | 6/2008 |

OTHER PUBLICATIONS

André Kurs et al.; Wireless Power Transfer via Strongly Coupled Magnetic Resonances; Research Articles; Jul. 2007, pp. 83-85, Science vol. 317, wwvv.sciencemag.org.

* cited by examiner

*Primary Examiner* — Edwin Holloway, III

(74) *Attorney, Agent, or Firm* — Antonelli, Terry, Stout & Kraus, LLP.

(57) ABSTRACT

In wireless electric power transmission and reception, the efficiency of transmission and reception is improved and a device to which electric power can be supplied is specified to improve security.

Two antennas with different resonance frequencies are provided, and the resonance frequencies of a reception loop and a reception coil of a receiver are corrected in accordance with a reception status of a carrier transmitted from a transmitter to improve the efficiency of transmission and reception. Further, data transmitted from the transmitter are demodulated on the basis of the reception levels of two antennas with different resonance frequencies, and the data are transmitted to the transmitter using a reflective wave to perform data transmission and reception. By using this, device authentication is performed, and security is improved.

7 Claims, 10 Drawing Sheets

ELECTRIC POWER TRANSMITTING AND RECEIVING DEVICE, ELECTRIC POWER TRANSMITTING DEVICE AND ELECTRIC POWER RECEIVING DEVICE

CLAIM OF PRIORITY

The present application claims priority from Japanese patent application serial no. JP 2008-319857, filed on Dec. 16, 2008, the content of which is hereby incorporated by reference into this application.

BACKGROUND OF THE INVENTION (1) Field of the Invention

The present invention relates to an electric power transmitting and receiving device, an electric power transmitting device and an electric power receiving device, and particularly to an electric power transmitting and receiving device, an electric power transmitting device and an electric power receiving device, all of which are excellent in transmission and reception efficiency and enable data transmission and reception.

(2) Description of the Related Art

As a method of wirelessly transmitting and receiving electric power, there have been known electric power transmitting and receiving methods of an electromagnetic induction method using electromagnetic induction and a magnetic resonance method using magnetic resonance.

For charging of an electric toothbrush, an electric shaver, and a mobile electronic device, wireless electric power transmission and reception by an electromagnetic induction method has been utilized because of unnecessity of metal terminals and their simple structures. The method is disclosed in Japanese Patent Application Laid-Open No. H10-97931 and Japanese Patent Application Laid-Open No. 2008-141940.

Further, diversification of recent devices has boosted demand for wireless electric power transmission and reception of large electric power (up to 100 W) in a medium range of distance (up to 10 m). Therefore, wireless electric power transmission and reception by a magnetic resonance method has been developed, and is disclosed in, for example, Andre Kurs, et al. "Wireless Power Transfer via Strongly Coupled Magnetic Resonances," SCIENCE, VOL 317, pp. 83-85, 6 Jul. 2007.

SUMMARY OF THE INVENTION

In Japanese Patent Application Laid-Open No. H10-97931, binding and positional accuracy are enhanced by a projection to improve the efficiency of transmission and reception. In Japanese Patent Application Laid-Open No. 2008-141940, positional accuracy of a thin device is enhanced by a positional sensor and a projection to improve the efficiency of transmission and reception.

In these patent documents, there is described an example in which noncontact electric power transmission and reception is performed by electromagnetic induction. In the electromagnetic induction method, the transmission and reception range is short, and electric power of transmission and reception is small. Therefore, a method of improving the transmission and reception efficiency has been developed as described above.

On the other hand, in the magnetic resonance method as described in Andre Kurs, et al. "Wireless Power Transfer via Strongly Coupled Magnetic Resonances," SCIENCE, VOL 317, pp. 83-85, 6 Jul. 2007, a transmittable and receivable range of electric power is determined on the basis of a wavelength. However, electric power can be transmitted and received farther than the electromagnetic induction method, and large electric power can be wirelessly transmitted and received. However, the transmission and reception efficiency is deteriorated due to variation of a resonance frequency as similar to the electromagnetic induction method, and improving this problem is an important issue.

In view of the above-described problems, an object of the present invention is to provide a wireless electric power transmitting and receiving device, an electric power transmitting device and an electric power receiving device, all of which are excellent in transmission and reception efficiency and enable data transmission and reception.

In order to solve the above-described problems, the present invention provides an electric power transmitting and receiving device for transmitting electric power from a transmitting device to a receiving device using magnetic resonance at a predetermined resonance frequency, wherein the transmitting device includes: a transmission unit which includes a transmission loop and a transmission coil and transmits the electric power; a supplying unit which supplies the electric power to the transmission unit; a detection unit which detects a frequency transmitted from the transmission unit; and a transmitter which includes a first correction unit for correcting the frequency transmitted from the transmission unit, and the receiving device includes: a reception unit which includes a reception loop and a reception coil for receiving the electric power transmitted from the transmission unit; a first antenna having a resonance frequency higher than that of the reception unit; a second antenna having a resonance frequency lower than that of the reception unit; a comparing unit which compares reception levels between the first antenna and the second antenna; and a receiver which includes a second correction unit for correcting the resonance frequency of the reception unit on the basis of the comparison result of the comparing unit.

According to the present invention, it is advantageous to provide an electric power transmitting and receiving device, an electric power transmitting device and an electric power receiving device, all of which are excellent in transmission and reception efficiency and are improved in user-friendliness.

Further, it is also advantageous to provide an electric power transmitting and receiving device, an electric power transmitting device and an electric power receiving device, all of which enable data transmission and reception as needed and are improved in security.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Hereinafter, embodiments of the present invention will be described on the basis of the drawings.

[First Embodiment]

First of all, an electric power transmitting and receiving method in the embodiment will be described using FIG. 1.

Figure 1:
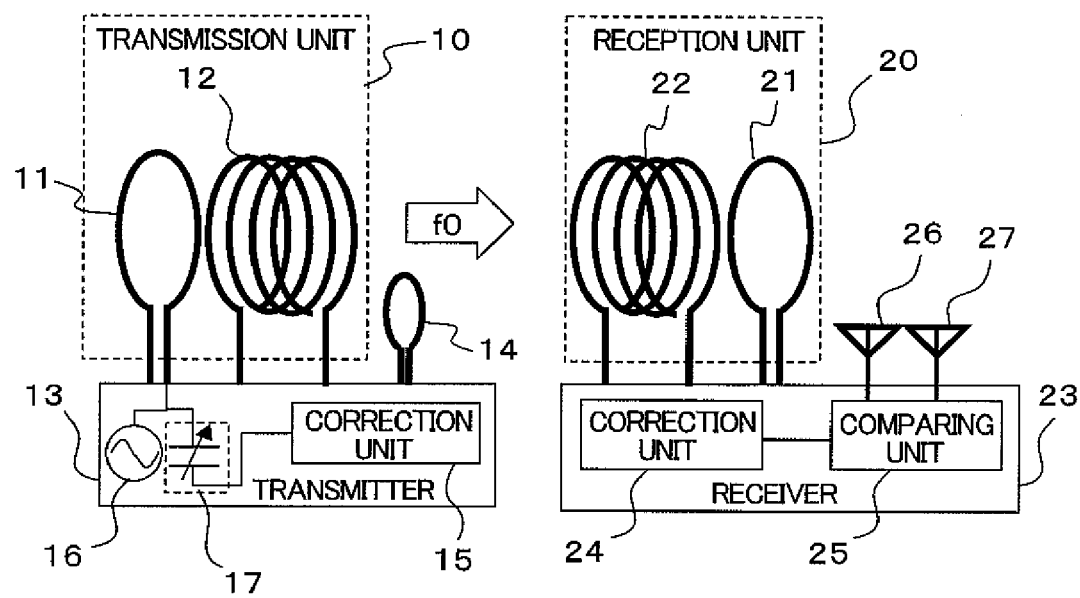
FIG. 1 is a block diagram of an electric power transmitting and receiving device showing an embodiment of the present invention.

FIG. 1 is a block diagram of an electric power transmitting and receiving device showing an embodiment of the present invention. In FIG. 1, the reference numeral 10 denotes a transmission unit including a transmission loop 11 and a transmission coil 12. The reference numeral 13 denotes a transmitter which includes a correction unit 15, an oscillation unit (that is also a supplying unit of electric power) 16, and an oscillation frequency adjusting unit 17 and which is coupled to the transmission unit 10 and a correction loop (that is also, as will be described later, a detection unit of electric power or frequencies) 14. The reference numeral 20 denotes a reception unit which includes a reception loop 21 and a reception coil 22. The reference numeral 23 denotes a receiver which is coupled to the reception unit 20 and which includes a correction unit 24, a comparing unit 25, an antenna 26, and an antenna 27. It should be noted that a combination of the transmission unit 10 and the transmitter 13 is referred to as an electric power transmitting device, and a combination of the reception unit 20 and the receiver 23 is referred to as an electric power receiving device in some cases.

The transmitter 13 includes the oscillation unit 16 which oscillates at a frequency of f0, and supplies electric power to the transmission unit 10 including the transmission loop 11 and the transmission coil 12. The transmission unit 10 allows the transmission loop 11 and the transmission coil 12 to excite a magnetic field. The correction unit 15 allows the correction loop 14 to detect electric power transmitted from the transmission unit 10, and corrects an oscillation frequency to f0 by feeding back to the oscillation frequency adjusting unit 17, so that a detection level is maximized. The reception unit 20 includes the reception loop 21 and the reception coil 22, and magnetically resonates at an oscillation frequency of f0 excited by the transmission unit 10. Electric power is retrieved by the reception loop 21, and the electric power received by the reception unit 20 is supplied to the receiver 23. The oscillation frequency of the transmission unit 10 is corrected to f0, but is slightly changed due to variation of the correction unit 15, the oscillation unit 16, and the like, and environmental fluctuation of temperature and the like. As a result, the efficiency of electric power transmission and reception is deteriorated. When the oscillation frequency of the transmission unit 10 is changed from f0 to fx, the reception unit 20 allows the comparing unit 25 to determine whether or not the frequency fx, received by the antenna 26 with a resonance frequency higher than f0 and received by the antenna 27 with a resonance frequency lower than f0, is higher than the resonance frequency f0 where the efficiency of electric power transmission and reception is maximized, and allows the correction unit 24 to correct the resonance frequency. The correction method of the resonance frequency includes a method in which the resonance frequency is changed using a variable capacity.

It should be noted that the correction method for the transmission unit 10 is not limited to the method of detection using the correction loop 14. For example, the impedance of the transmission loop 11 is measured to calculate a return loss, and corrects the transmission unit 10 so as to minimize the return loss.

Next, a correction method of an electric power transmitting and receiving device in the embodiment will be described using FIGS. 2 and 3.

Figure 2:
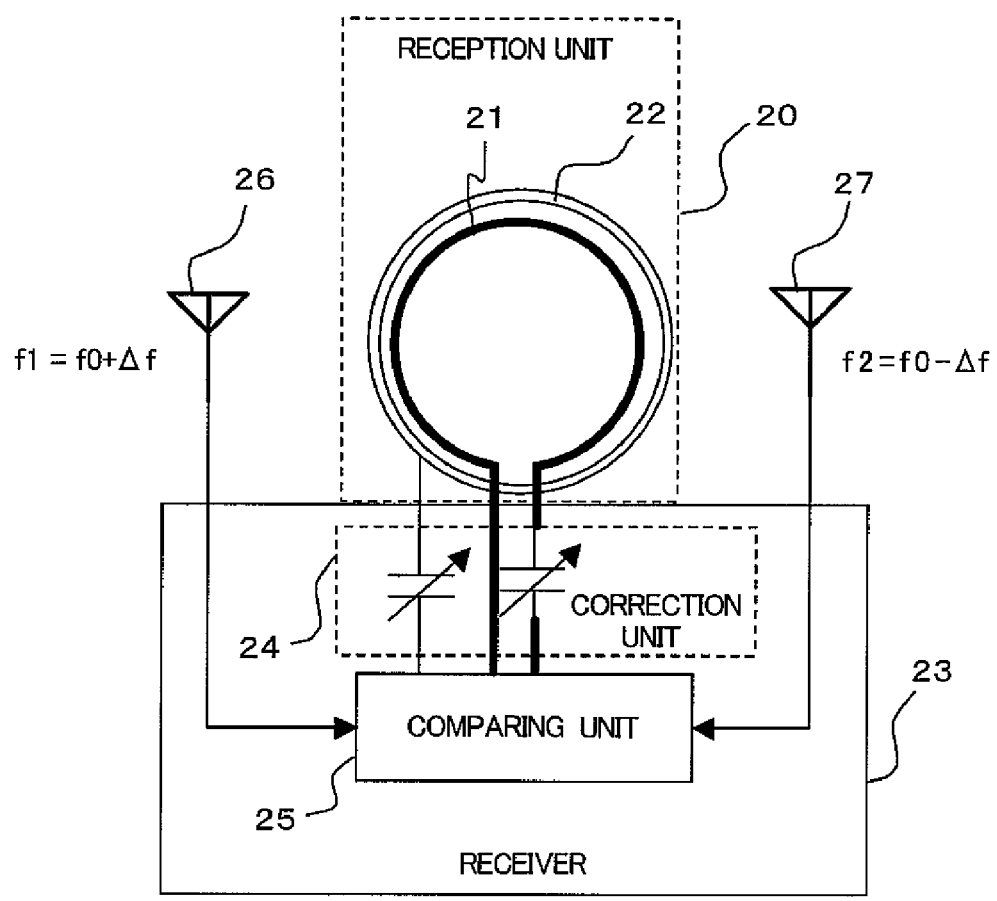
FIG. 2 is a block diagram of a receiver showing the embodiment of the present invention.

FIG. 2 is a block diagram of the receiver 23 in the embodiment. The receiver 23 includes the correction unit 24 and the comparing unit 25. The comparing unit 25 compares and computes the reception levels, frequencies, and phases of the antennas 26 and 27. A resonance frequency f1 of the antenna 26 is obtained by f0+Δf, and a resonance frequency f2 of the antenna 27 is obtained by f0−Δf. The correction unit 24 controls the resonance frequency of the reception unit 20 including the reception loop 21 and the reception coil 22 on the basis of the comparison result of the comparing unit 25. When the oscillation frequency of the transmission unit 10 becomes higher than the resonance frequency f0 of the reception unit 20, the reception level of the antenna 26 with a high resonance frequency becomes higher. The receiver 23 decreases the capacitance value of the variable capacity of the correction unit 24, and increases the resonance frequency of the reception unit 20. Further, when the oscillation frequency of the transmission unit 10 becomes lower than the resonance frequency f0 of the reception unit, the reception level of the antenna 27 with a low resonance frequency becomes higher. The receiver 23 increases the capacitance value of the variable capacity of the correction unit 24, and decreases the resonance frequency of the reception unit 20.

Figure 3:
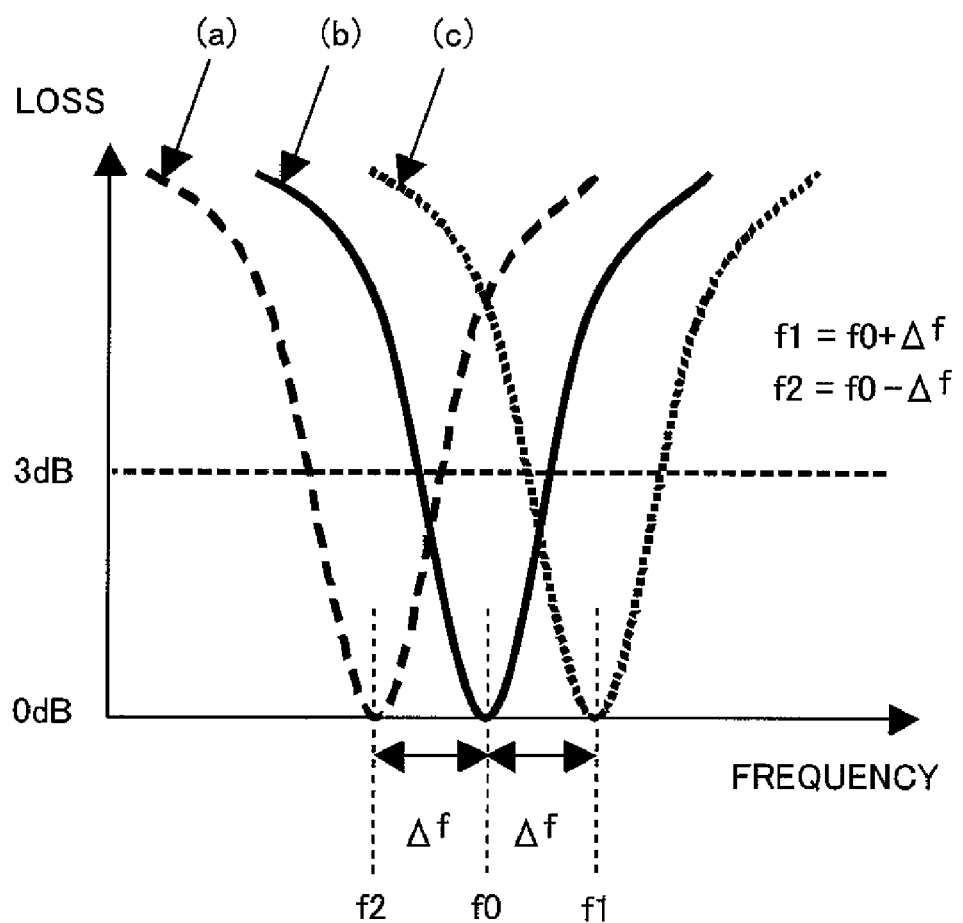
FIG. 3 is a frequency characteristic diagram of transmission and reception loss according to the embodiment of the present invention.

FIG. 3 shows frequency characteristics of transmission and reception loss in the embodiment, and shows a relation between the resonance frequencies of the reception unit 20 and the antennas 26 and 27 and the oscillation frequency of the transmission unit 10. As shown by (b) of FIG. 3, when the resonance frequency of the reception unit 20 and the oscillation frequency of the transmission unit 10 are f0, the efficiency is maximized. The loss in this state is set at 0 dB. The resonance frequency of the antenna 26 is f1 that is higher than f0 by Δf, and the resonance frequency of the antenna 27 is f2 that is lower than f0 by Δf. As shown by (c) of FIG. 3, as a selection example of the resonance frequency f1 of the antenna 26, when the resonance frequency f1 is selected so as to be higher than the frequency with which the loss in (b) is 3 dB on the side higher than f0, the loss caused by frequency variation can be suppressed up to 3 dB. As shown by (a) of FIG. 3, as a selection example of the resonance frequency f2 of the antenna 27, when the resonance frequency f2 is selected so as to be lower than the frequency with which the loss in (b) is 3 dB on the side lower than f0, the loss caused by frequency variation can be suppressed up to 3 dB. It is desirable to adjust a correction range and to enhance the accuracy of correction by increasing Δf when the frequency largely varies, and by decreasing Δf when the frequency does not largely vary.

It should be noted that f1 and f2 have equal frequency differences of $+\Delta f$ and $-\Delta f$ from f0, but the embodiment is not limited to this. For example, when the variation of oscillation frequency due to changes of temperature can be roughly estimated, the frequency differences of f1 and f2 from f0 may be changed from each other, such as f1=f0+$\Delta$fa and f2=f0−$\Delta$fb. Further, it is obvious that f1 and f2 are not limited to frequencies with which the losses become 3 dB.

Next, the embodiment will be described in detail by using an example in which the embodiment is applied to a mobile terminal.

Figure 4:
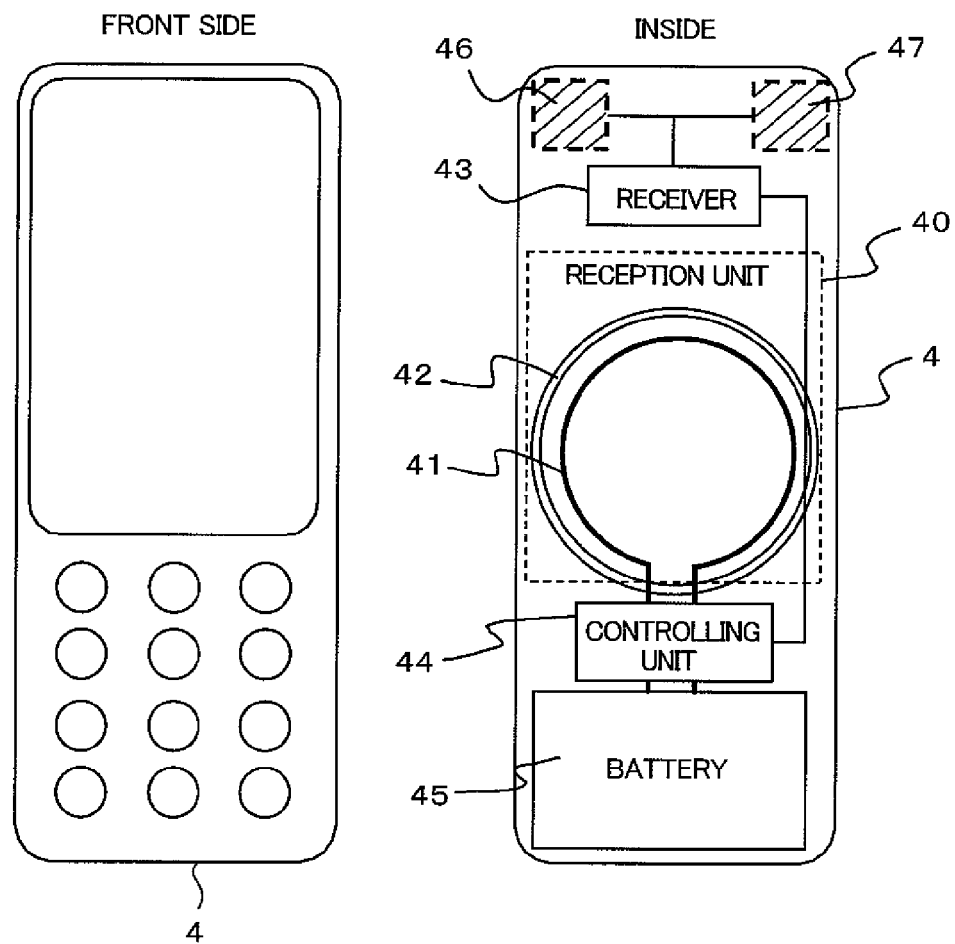
FIG. 4 is a block diagram of a mobile terminal showing the embodiment of the present invention.
Figure 5:
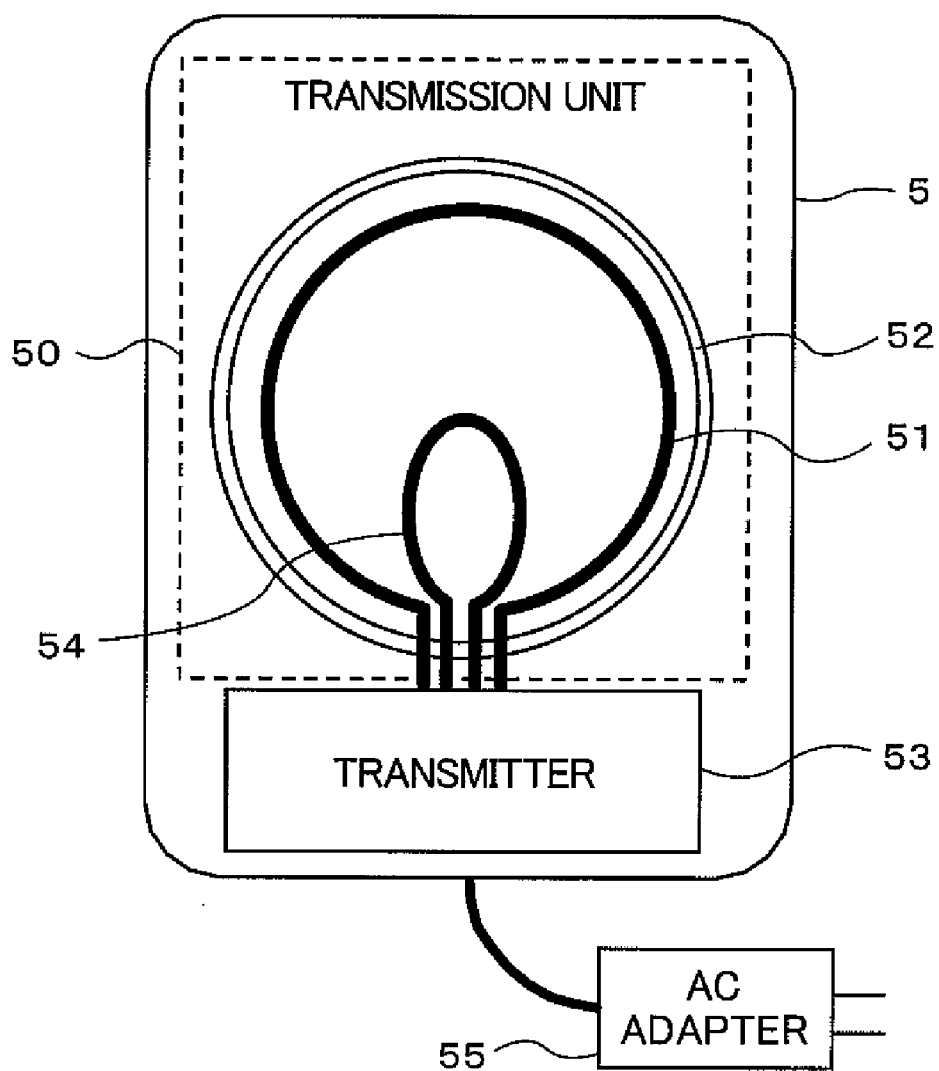
FIG. 5 is a block diagram of a charger showing the embodiment of the present invention.

FIG. 4 is a block diagram showing a mobile terminal 4, and FIG. 5 is a block diagram showing a charger 5 for supplying electric power to the mobile terminal 4. The mobile terminal 4 includes, as units relating to the electric power transmitting and receiving device of the embodiment, a reception unit 40 having a reception loop 41 and a reception coil 42, a receiver 43, a controlling unit 44, a battery 45, and antennas 46 and 47. The charger 5 includes a transmission unit 50 having a transmission loop 51 and a transmission coil 52, a transmitter 53 having correction and oscillation functions, a correction loop 54, and an AC adapter 55.

The charger 5 transmits electric power supplied from the AC adapter 55 to the mobile terminal 4 via the transmitter 53 and the transmission unit 50. The electric power from the charger 5 received by the transmission unit 40 of the mobile terminal 4 is charged to the battery 45 that is a power source of the mobile terminal 4.

Here, the oscillation frequency of the transmission unit 50 including the transmission loop 51 and the transmission coil 52 is f0. When the resonance frequency of the reception unit 40 including the reception loop 41 and the reception coil 42 corresponds to the oscillation frequency of the transmission unit 50, the efficiency is maximized. The resonance frequency of the antenna 46 is f1 that is higher than the resonance frequency f0 by $\Delta f$, and the resonance frequency of the antenna 47 is f2 that is lower than the resonance frequency f0 by $\Delta f$. By applying the method explained using FIGS. 2 and 3, the resonance frequency of the reception unit 40 is controlled by the controlling unit 44 on the basis of the reception levels of the antennas 46 and 47 in the receiver 43, so that the transmission and reception loss of electric power can be reduced.

It should be noted that the mobile terminal of FIG. 4 may be a mobile information terminal such as a mobile phone, a PDA (Personal Digital Assistant) or a POS (Point of Sale), a transportable and movable computer such as a notebook personal computer, or a disaster-relief robot, or may be a terminal that can be incorporated into cloths, containers, and the like. Further, the charger of FIG. 5 may be a charger that can be incorporated into terminals and devices similar to the above.

Figure 6:
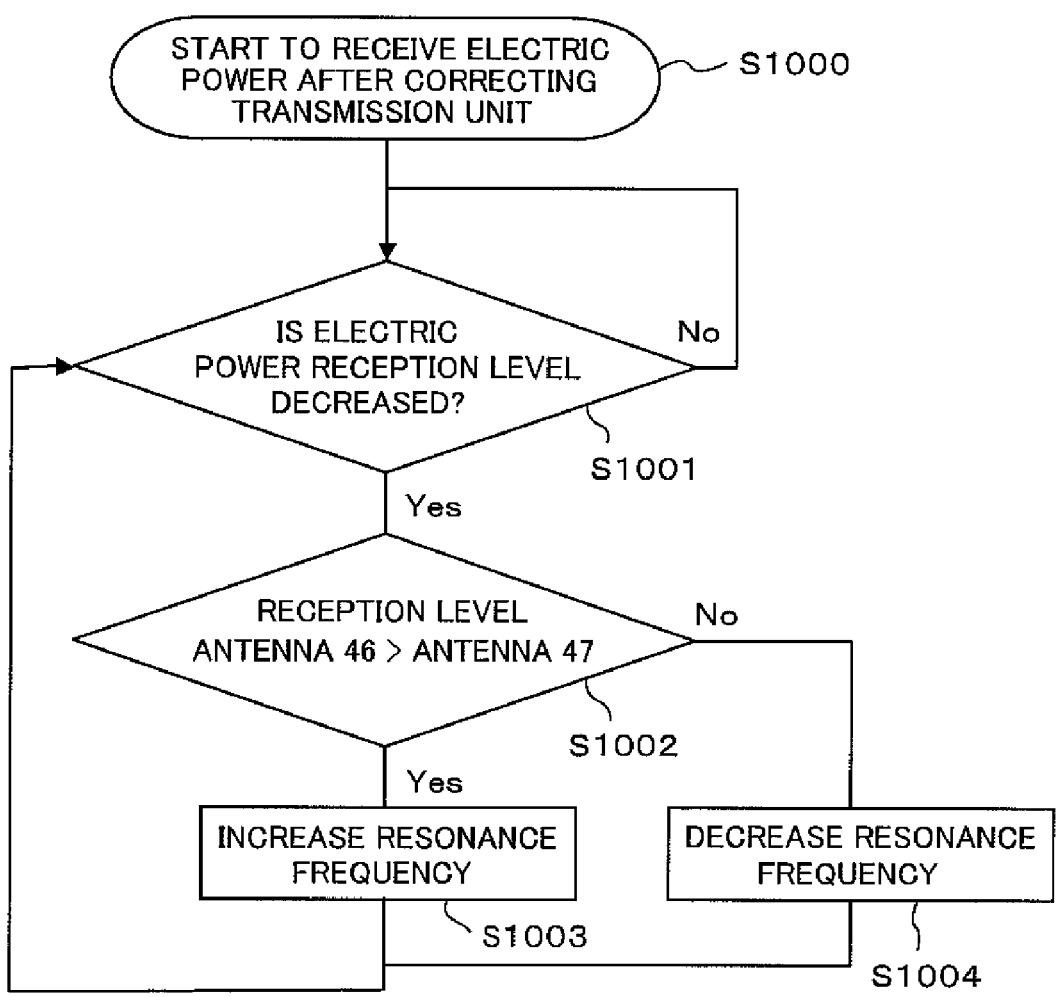
FIG. 6 is a flowchart of an electric power transmitting and receiving procedure showing the embodiment of the present invention.

An electric power transmitting and receiving procedure of the embodiment will be described using the flowchart of FIG. 6. First of all, a correction method for the transmission unit 50 and the transmitter 53 will be described. The transmission unit 50 of the charger 5 oscillates with electric power which is obtained from the AC adapter 55 and which is supplied from the transmitter 53. The transmitter 53 corrects the transmission unit 50 on the basis of the electric power, phases, frequencies and the like obtained from the correction loop 54, and adjusts the oscillation frequency to f0. It should be noted that the frequency is adjusted by changing the variable capacity for correction, and transmission electric power at the time of correction is output at the minimum level lower than that of normal transmission and reception.

Next, normal transmission and reception after correction will be described on the basis of FIG. 6. The charger 5 oscillates at an oscillation frequency of f0 to start electric power transmission and reception, and the mobile terminal 4 starts to receive electric power (Step S1000). In the case where the receiver 43 of the mobile terminal 4 detects reduction of the electric power supplied from the reception loop 41 and the reception coil 42 (yes in Step S1001), the reception levels of two antennas 46 and 47 are compared with each other (Step S1002). The variation of the resonance frequency of the reception unit 40 is corrected on the basis of the difference between the reception levels of the antennas 46 and 47. For example, the oscillation frequency excited by the transmission unit 50 varies on the higher side, the reception level of the antenna 46 with a high resonance frequency becomes higher (yes in Step S1002). In this case, the receiver 43 performs correction so as to increase the resonance frequencies of the reception loop 41 and the reception coil 42 (Step S1003). On the other hand, in the case where the oscillation frequency excited by the transmission unit 50 varies on the lower side, the reception level of the antenna 47 with a low resonance frequency becomes higher (no in Step S1002). In this case, the receiver 43 performs correction so as to decrease the resonance frequencies of the reception loop 41 and the reception coil 42 (Step S1004). It should be noted that in the case where the receiver 43 of the mobile terminal 4 does not detect reduction of the electric power supplied from the reception coil 42 in Step S1001 (no in Step S1001), the receiver 43 continuously monitors reduction of the electric power. The above-described flow may be continued up to completion of transmitting and receiving operations of electric power.

Even if the frequency varies in the magnetic resonance method due to changes of temperature and the like, it is possible to realize electric power transmission and reception with high efficiency by the above-described configuration.

It should be noted that the correction of the resonance frequency may be performed for one of the reception loop 41 and the reception coil 42, or the correction of the resonance frequency may be independently performed for each of the reception loop 41 and the reception coil 42. Further, the antennas 46 and 47 may be those used in other systems, and are not limited to use dedicated for correction of the resonance frequency. For example, the antennas may be those used in a GPS (Global Positioning System), television broadcasting, noncontact communications, and the like.

[Second Embodiment]

The electric power transmitting and receiving device in the first embodiment corrects the resonance frequencies of the reception loop and the reception coil on the basis of the reception levels of the antennas, but the second embodiment is not limited to this. For example, together with the correction amount of the resonance frequency, the resonance frequency of each antenna is simultaneously corrected, so that the correction range of the resonance frequency is widened and it is possible to realize electric power transmission and reception with higher efficiency. As a modified example of the first embodiment, there will be described an example in which the loop antennas, the reception loop, the reception coil are concentrically arranged on the same plane.

Figure 7:
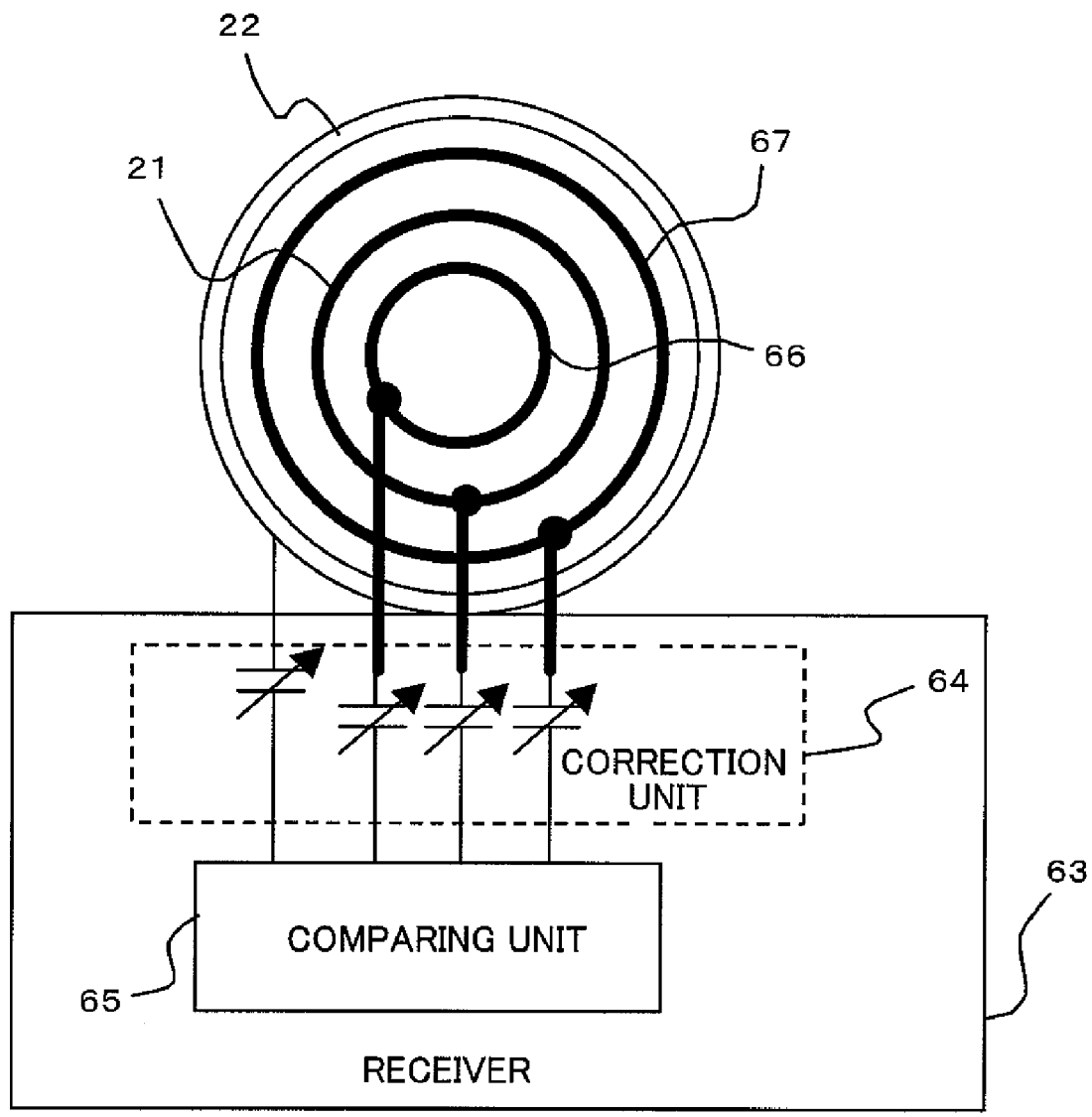
FIG. 7 is a block diagram of an electric power transmitting and receiving device showing another embodiment of the present invention.

FIG. 7 is a block diagram of an electric power transmitting and receiving device showing another embodiment of the present invention. Constituent elements similar to those in FIG. 1 are given the same reference numerals. In FIG. 7, the reference numeral 63 denotes a receiver including a correction unit 64 and a comparing unit 65, and loop antennas 66 and 67 are coupled to the receiver 63. The loop antenna 66 is smaller in diameter than the reception loop 21, and the resonance frequency (f1) of the loop antenna 66 is higher than those of the reception loop 21 and the reception coil 22. In addition, the loop antenna 67 is larger in diameter than the reception loop 21, and the resonance frequency (f2) of the loop antenna 67 is lower than those of the reception loop 21 and the reception coil 22. Further, these loop antennas are produced on the same plane and the same substrate, so that frequency differences Δf of the reception loop 21 and the loop antennas 66 and 67 do not relatively vary even when disturbance such as changes of temperature occurs. Accordingly, the present invention can be carried out in a more desirable manner.

In FIG. 7, variable capacities for adjusting the resonance frequency are provided even in the loop antennas 66 and 67 in the correction unit 64. Accordingly, it is possible to adjust, together with the resonance frequencies of the reception loop 21 and the reception coil 22, the resonance frequencies of the loop antennas 66 and 67, and these resonance frequencies do not relatively vary. The other operations are the same as those in the first embodiment, and thus the detailed explanation will not be repeated.

Figure 8:
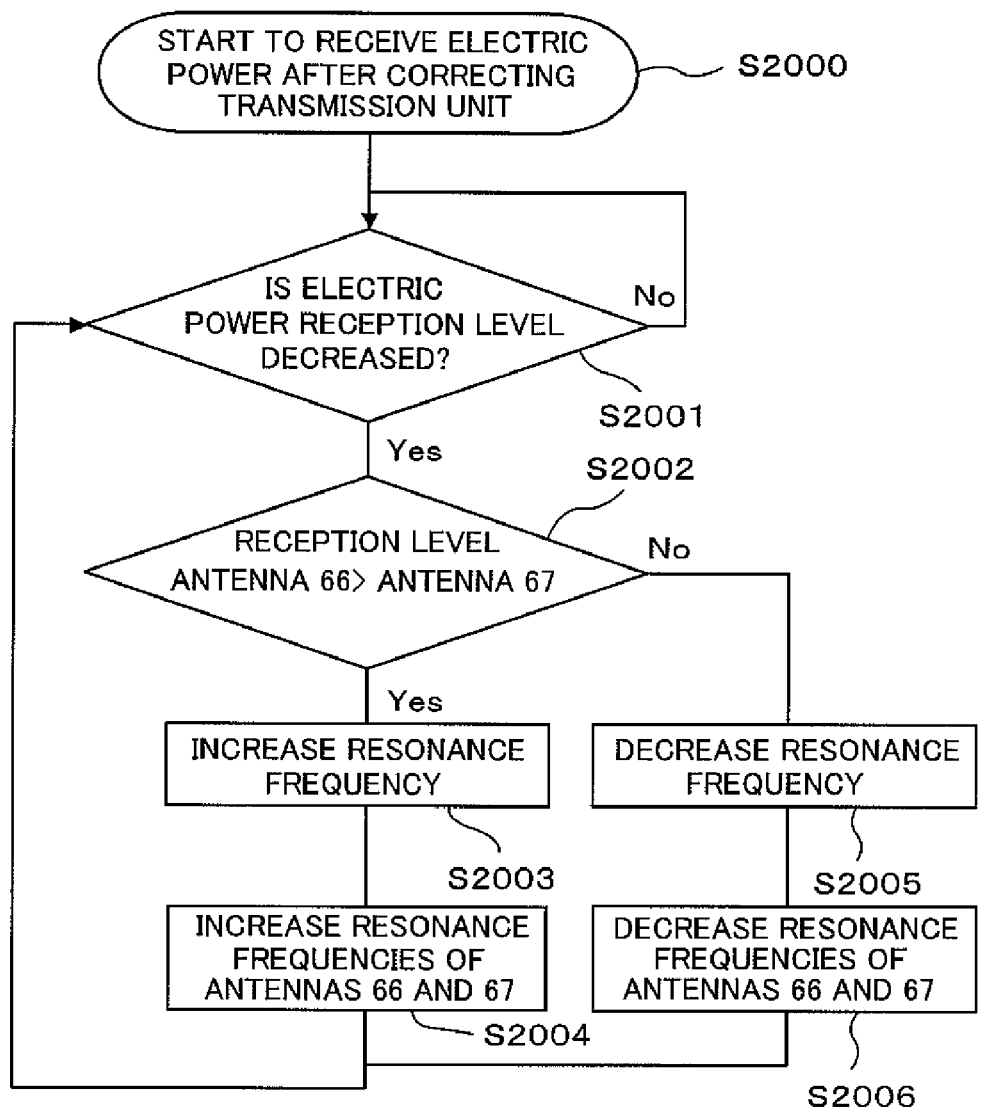
FIG. 8 is a flowchart of an electric power transmitting and receiving procedure showing another embodiment of the present invention.

Next, an electric power transmitting and receiving procedure will be described using the flowchart of FIG. 8. As similar to the first embodiment, the correction unit of the transmitter allows the correction loop to perform correction, and adjusts the oscillation frequency of the transmitter to f0. The reception loop 21 and the reception coil 22 of the receiver 63 magnetically resonate with a magnetic field excited by the transmission unit, and start to receive electric power (Step S2000). In the case where the comparing unit 65 of the receiver 63 detects reduction of the electric power supplied from the reception loop 21 and the reception coil 22 (yes in Step S2001), the reception levels of the loop antennas 66 and 67 are compared with each other (Step S2002). The variation of the resonance frequencies of the reception loop 21, the reception coil 22, and the loop antennas 66 and 67 is corrected on the basis of the difference between the reception levels. In the case where the oscillation frequency excited by the transmission unit varies on the higher side, the reception level of the antenna 66 with a high resonance frequency becomes higher (yes in Step S2002). The receiver 63 performs correction so as to increase the resonance frequencies f0 of the reception loop 21 and the reception coil 22 (Step S2003), and performs correction so as to increase the resonance frequencies of the loop antennas 66 and 67 (Step S2004). On the other hand, in the case where the oscillation frequency excited by the transmission unit varies on the lower side, the reception level of the loop antenna 67 with a low resonance frequency becomes higher (no in Step S2002). The receiver 63 performs correction so as to decrease the resonance frequencies of the reception loop 21 and the reception coil 22 (Step S2005), and performs correction so as to decrease the resonance frequencies of the loop antennas 66 and 67 (Step S2006). The correction of the resonance frequency is performed by using the variable capacities of the correction unit 64. It should be noted that in the case where the receiver 63 does not detect reduction of the electric power supplied from the reception coil 21 in Step S2001 (no in Step S2001), the receiver 63 continuously monitors reduction of the electric power. The above-described flow may be continued up to completion of transmitting and receiving operations of the electric power.

According to the second embodiment the correction range of the resonance frequency is widened. So even under the conditions where temperature is largely changed, it is possible to improve the efficiency of electric power transmission and reception by the above-described configuration.

It should be noted that electric power of the loop antennas 66 and 67 used for correction may be added to improve the efficiency. For example, the loop antennas 66 and 67 may be used for comparison between the reception levels during correction, and received electric power may be added to that received by the reception loop 21 and the reception coil 22 other than the correction time. Further, in order to recognize reduction of the electric power supplied to the receiver 63, the reception levels of electric power of the reception loop 21 and the reception coil 22 are detected. However, the detection time is not limited to the time when starting to receive the electric power, but the reception levels may be detected periodically or on an as-needed basis. Moreover, the circular loop antennas, reception loop, and reception coil are exemplified in the description of the above-described embodiment. However, the shape is not limited to a circle in the present invention, but a rectangular shape may be employed.

[Third Embodiment]

The electric power transmitting and receiving device of the first embodiment or the second embodiment corrects the resonance frequencies of the reception unit and each antenna to improve the efficiency by using two antennas whose resonance frequencies are higher and lower than that of the reception unit. However, the third embodiment is not limited to this, but different resonance frequencies are used to realize data communications.

Figure 9:
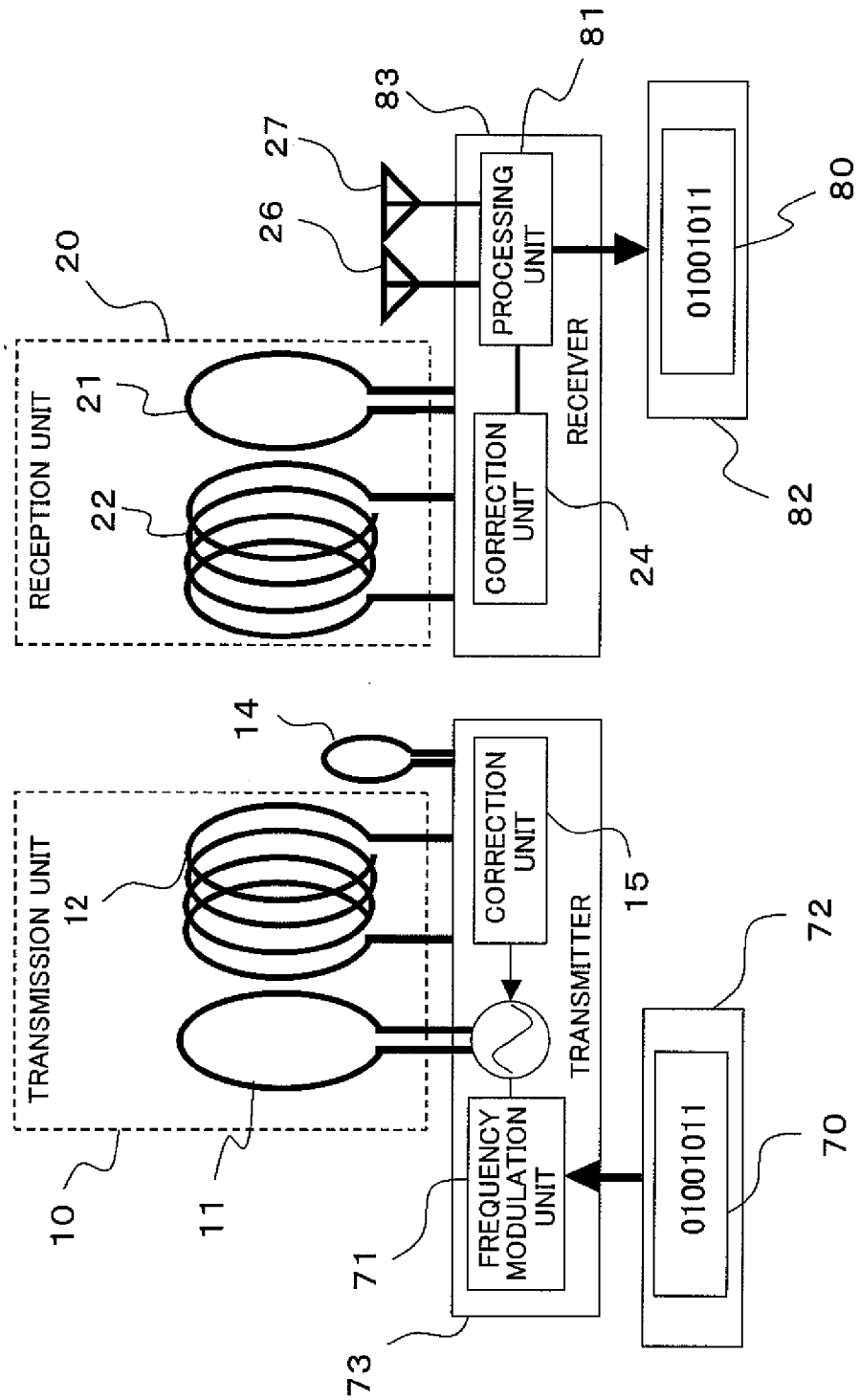
FIG. 9 is a block diagram of an electric power transmitting and receiving device showing still another embodiment of the present invention.

FIG. 9 is a block diagram of an electric power transmitting and receiving device showing still another embodiment of the present invention. FIG. 9 shows a configuration similar to that of the first embodiment shown in FIG. 1. However, a frequency modulation unit 71 and a processing unit 81 are provided in a transmitter 73 and a receiver 83, respectively. It should be noted that, although not shown in the drawing, the oscillation frequency adjusting unit 17 is provided in the transmitter 73 as similar to FIG. 1. Further, the processing unit 81 of the receiver 83 is provided with the function of the comparing unit 25 in FIG. 1. The correction of the oscillation frequency of the transmission unit, the correction of the resonance frequency of the reception unit, and the electric power transmission and reception are similar to those of the first embodiment. Thus, the explanations thereof will not be repeated, and data communications will be described in detail.

There will be described an example in which after the oscillation frequency of the transmission unit is corrected, data communications are performed prior to transmission and reception of electric power. The frequency modulation unit 71 of the transmitter 73 switches the oscillation frequency in a time-division manner on the basis of data 70 stored in a memory 72. Here, the input data 70 are digital data of "0" and "1". When a bit is "0", the transmission unit 10 operates so as to set the oscillation frequency at f1, and when a bit is "1", the transmission unit 10 operates so as to set the oscillation frequency at f2. The processing unit 81 of the receiver 83 compares the reception levels between the antenna 26 with a resonance frequency of f1 and the antenna 27 with a resonance frequency of f2. In the case where the reception level of the antenna 26 with a high resonance frequency is higher, it is determined as "0". In the case where the reception level of the antenna 27 with a low resonance frequency is higher, it is determined as "1". Then, data 80 are stored into a memory 82. As described above, it is possible to perform data communications using a difference between the reception levels of two antennas with different resonance frequencies.

Figure 10:
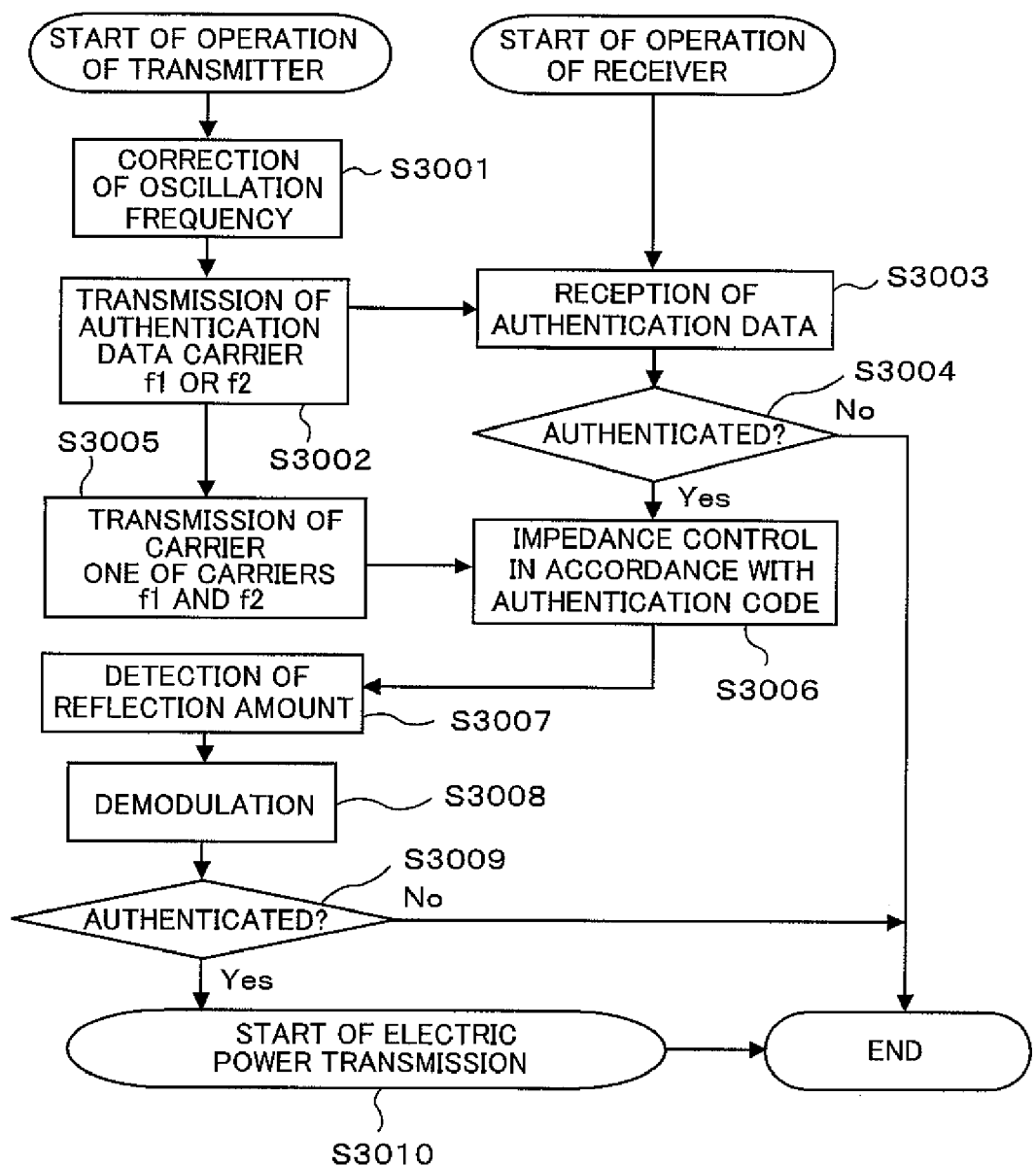
FIG. 10 is a flowchart of data communications showing still another embodiment of the present invention.

Next, there will be described an example in which the embodiment is used in device authentication. FIG. 10 is a flowchart of data communications showing still another embodiment of the present invention, and shows a case in which the embodiment is used in device authentication.

The transmitter 73 corrects the oscillation frequency of the transmission unit 10 (Step S3001). In accordance with the data 70 that are device authentication information, the oscillation frequency of the transmission unit 10 is changed to f1 and f2 for transmission prior to starting of transmission and reception of electric power (Step S3002). The receiver 83 receives the data 70 using the antennas 26 and 27 (Step S3003). The processing unit 81 of the receiver 83 performs demodulation on the basis of changes of the reception levels of the antennas 26 and 27 as described above, and compares with the data 80 that are device authentication information stored, in advance, in the memory 82 to determine whether or not to authenticate the data (Step S3004). The transmitter 73 transmits the data 70 as described above, and then transmits a carrier with one of the frequencies f1 and f2 (Step S3005).

In the case where it is determined that the received data correspond to the data 80 and the data are authenticated (yes in Step S3004), the receiver 83 transmits the data 80 that are device authentication information stored in the memory 82 to the transmitter 73. Therefore, for example, in the case where the transmitter 73 transmits the carrier with a frequency of f1 in Step 3005, the impedance of the antenna 26 is changed, and in the case where the transmitter 73 transmits the carrier with a frequency of f2, the impedance of the antenna 27 is changed. The load on the carrier is changed by a method called a backscatter method, so that the data 80 are transmitted to the transmitter 73 (Step S3006).

The transmitter 73 allows the transmission unit 10 to detect, for example, the reflection amount of the carrier changed by impedance control performed by the transmitter 83 (Step S3007), to demodulate the data (Step S3008). The demodulation result is compared with the data 70 that are device authentication information stored in the memory 72 so as to determine whether or not to authenticate the data (Step S3009). If the demodulation result corresponds to the data 70 and is authenticated (yes in the flowchart), the electric power transmission and reception is started (Step S3010). The operations are continued up to completion of the transmitting and receiving operations of electric power.

In the case where the data received by the transmitter 73 do not correspond to the data 70 and are not authenticated in Step 3009 (no in the flowchart), the operation is terminated without performing the electric power transmission and reception.

In the case where the data received by the receiver 83 do not correspond to the data 80 and are not authenticated in Step 3004 (no in the flowchart), the receive 83 does not transmit the data to the transmitter 73, and the operation is terminated without performing the electric power transmission and reception.

The data communications are realized by the above-described operations, and electric power can be supplied to only the receiver which is permitted to receive the electric power by the communication of the device authentication, so that security and the like can be enhanced. Further, the frequency of the transmission unit or the reception unit is corrected, so that the efficiency of the electric power transmission and reception can be improved. Moreover, convenience of the device to which the electric power is supplied through wireless transmission and reception can be also improved.

There is shown the example in which the data are demodulated on the basis of changes of the reception levels of the first and second antennas of the reception unit. However, the invention is not limited to this. For example, a reception level is assumed as a threshold value, and one or both of the reception levels may be compared with the threshold value for demodulation. Further, there is shown the example in which the reception side changes the impedance of the carrier from the transmission side and performs communications with the backscatter method in which a reflection wave is modulated to respond. However, the invention is not limited to this. For example, AM or FM modulation using a single carrier may be performed.

Further, there is shown the case in which the authentication data are transmitted as the communication data. However, it is obvious that the present invention is not limited to this. For example, information for indicating the level of electric power that the transmitter 73 transmits may be delivered from the receiver 83 to the transmitter 73.

Further, the number of the antennas 26 and 27 of the reception unit is two. However, the present invention is not limited to this. For example, only when the reception level is increased or decreased, the correction may be performed using one antenna. Furthermore, three or more antennas may be used to improvement the accuracy of correction and a data transmission and reception speed.

A number of other embodiments in which constituent elements and operations are added and changed are possible instead of the above-described embodiments. However, they fall within the gist of the present invention.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An electric power transmitting and receiving device for transmitting electric power from a transmitting device to a receiving device using magnetic resonance at a predetermined resonance frequency, wherein the transmitting device includes:
    a transmission unit which includes a transmission loop and a transmission coil and transmits the electric power; a supplying unit which supplies the electric power to the transmission unit; a detection unit which detects a frequency transmitted from the transmission unit; and a transmitter which includes a first correction unit for correcting the frequency transmitted from the transmission unit, and
    the receiving device includes:
    a reception unit which includes a reception loop and a reception coil for receiving the electric power transmitted from the transmission unit; a first antenna having a resonance frequency higher than that of the reception unit; a second antenna having a resonance frequency lower than that of the reception unit; a comparing unit which compares reception levels between the first antenna and the second antenna; and a receiver which includes a second correction unit for correcting the resonance frequency of the reception unit on the basis of the comparison result of the comparing unit.

2. The electric power transmitting and receiving device according to claim 1, wherein
    the transmitter further includes a frequency modulation unit which changes a frequency in accordance with digital data transmitted to the receiver, and the receiver further includes a processing unit which demodulates digital data on the basis of the reception levels of the first antenna and the second antenna.

3. The electric power transmitting and receiving device according to claim 2, wherein transmission and reception of the digital data are performed during a period which is different from a period during which electric power is transmitted and received.

4. An electric power receiving device for receiving electric power using magnetic resonance at a predetermined resonance frequency, the device comprising:
a reception unit which includes a reception loop and a reception coil for receiving the electric power; a first antenna having a resonance frequency higher than that of the reception unit; a second antenna having a resonance frequency lower than that of the reception unit; a comparing unit which compares reception levels between the first antenna and the second antenna; and a receiver which includes a correction unit for correcting the resonance frequency of the reception unit on the basis of the comparison result of the comparing unit.

5. The electric power receiving device according to claim 4, wherein
the reception loop, the reception coil, the first antenna, and the second antenna are arranged on the same plane.

6. The electric power receiving device according to claim 4, wherein
each electric power received by the reception loop, the reception coil, the first antenna, and the second antenna is added.

7. The electric power receiving device according to claim 4, wherein
the first antenna and the second antenna are antennas used in a GPS, television broadcasting, and noncontact communication.

* * * * *